US010810121B2

(12) United States Patent
Chen et al.

(10) Patent No.: US 10,810,121 B2
(45) Date of Patent: Oct. 20, 2020

(54) DATA MERGE METHOD FOR REWRITABLE NON-VOLATILE MEMORY STORAGE DEVICE AND MEMORY CONTROL CIRCUIT UNIT

(71) Applicant: PHISON ELECTRONICS CORP., Miaoli (TW)

(72) Inventors: Chien-Wen Chen, Taoyuan (TW); Ting-Wei Lin, New Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 33 days.

(21) Appl. No.: 16/239,535

(22) Filed: Jan. 4, 2019

(65) Prior Publication Data

US 2020/0133844 A1 Apr. 30, 2020

(30) Foreign Application Priority Data

Oct. 25, 2018 (TW) .............................. 107137810 A

(51) Int. Cl.
G06F 12/02 (2006.01)
G06F 12/06 (2006.01)
G06F 12/1045 (2016.01)
G06F 3/06 (2006.01)
G06F 12/12 (2016.01)

(52) U.S. Cl.
CPC .......... *G06F 12/0253* (2013.01); *G06F 3/061* (2013.01); *G06F 3/065* (2013.01); *G06F 3/0652* (2013.01); *G06F 3/0679* (2013.01); *G06F 12/0638* (2013.01); *G06F 12/1045* (2013.01); *G06F 12/12* (2013.01); *G06F 3/0607* (2013.01)

(58) Field of Classification Search
CPC ........................... G06F 3/0607; G06F 12/0253
See application file for complete search history.

(56) References Cited

U.S. PATENT DOCUMENTS

2005/0036372 A1* 2/2005 Sasaki ................... G06F 3/0607
365/202
2014/0075103 A1* 3/2014 Wang .................. G06F 12/0246
711/103

FOREIGN PATENT DOCUMENTS

TW 200844740 11/2008

OTHER PUBLICATIONS

"Office Action of Taiwan Counterpart Application", dated Jun. 11, 2019, pp. 1-7.

* cited by examiner

*Primary Examiner* — Tammara R Peyton
(74) *Attorney, Agent, or Firm* — JCIPRNET

(57) ABSTRACT

A data merge method for a rewritable non-volatile memory module including a plurality of physical units is provided according to an exemplary embodiment of the disclosure. The method includes: obtaining a first logical distance value between a first physical unit and a second physical unit among the physical units, and the first logical distance value reflects a logical dispersion degree between at least one first logical unit mapped by the first physical unit and at least one second logical unit mapped by the second physical unit; and performing a data merge operation according to the first logical distance value, so as to copy valid from a source node to a recycling node.

18 Claims, 10 Drawing Sheets

DATA MERGE METHOD FOR REWRITABLE NON-VOLATILE MEMORY STORAGE DEVICE AND MEMORY CONTROL CIRCUIT UNIT

CROSS-REFERENCE TO RELATED APPLICATION

This application claims the priority benefit of Taiwan application serial no. 107137810, filed on Oct. 25, 2018. The entirety of the above-mentioned patent application is hereby incorporated by reference herein and made a part of this specification.

BACKGROUND

Technical Field

The disclosure relates to a flash memory technology, and more particularly to a data merge method, a memory storage device, and a memory control circuit unit.

Description of Related Art

Digital cameras, mobile phones, and MP3 players have been growing very quickly in recent years, causing consumer demand for storage media to increase rapidly. Since a rewritable non-volatile memory module (e.g. a flash memory) has characteristics such as data non-volatile, power saving, small size, no mechanical structure, etc., the rewritable non-volatile memory module is very suitable to be built in the various portable multimedia devices exemplified above.

When a memory storage device is out of factory, a part of physical units in the memory storage device is configured as spare physical units, so as to use these spare physical units to store new data. After a period of use, the number of these spare physical units in the memory storage device may gradually decrease. Accordingly, the memory storage device may copy valid data from source nodes to recycling nodes (also referred to as the target nodes) by performing a data merge procedure (or called a garbage collection procedure) and then erase some physical units belonging to the source nodes to release new spare physical units. However, in the data merge procedure, more the logical units mapped by the physical units selected as the source nodes are dispersed, the more tables that record the management information (such as mapping information) of these logical units need to be accessed, thereby increasing the number of accesses to the memory storage device and accelerating the wear of the memory storage device (e.g., the memory cells).

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The disclosure provides a data merge method, a memory storage device, and a memory control circuit unit, which are capable for effectively reducing an access count of the memory storage device during a data merge operation.

A data merge method for a rewritable non-volatile memory module is provided according to an exemplary embodiment of the disclosure. The rewritable non-volatile memory module includes a plurality of physical units. The data merge method comprises: obtaining a first logical distance value between a first physical unit and a second physical unit among the physical units, wherein the first logical distance value reflects a logical dispersion degree between at least one first logical unit mapped by the first physical unit and at least one second logical unit mapped by the second physical unit; and performing a data merge operation according to the first logical distance value, so as to copy valid data from a source node among the physical units to a recycling node among the physical units.

A memory storage device including a connection interface unit, a rewritable non-volatile memory module and a memory control circuit unit is provided according to an exemplary embodiment of the disclosure. The connection interface unit is configured to connect a host system. The rewritable non-volatile memory module includes a plurality of physical units. The memory control circuit unit is coupled to the connection interface unit and the rewritable non-volatile memory module. The memory control circuit unit is configured to obtain a first logical distance value between a first physical unit and a second physical unit among the physical units. The first logical distance value reflects a logical dispersion degree between at least one first logical unit mapped by the first physical unit and at least one second logical unit mapped by the second physical unit. The memory control circuit unit is further configured to perform a data merge operation according to the first logical distance value, so as to copy valid data from a source node among the physical units to a recycling node among the physical units.

A memory control circuit unit for controlling a rewritable non-volatile memory module including a plurality of physical units is provided according to an exemplary embodiment of the disclosure. The memory control circuit unit includes a host interface, a memory interface and a memory management circuit. The host interface is configured to couple to a host system. The memory interface is configured to couple to the rewritable non-volatile memory module. The memory management circuit is coupled to the host interface and the memory interface. The memory management circuit is configured to obtain a first logical distance value between a first physical unit and a second physical unit among the physical units. The first logical distance value reflects a logical dispersion degree between at least one first logical unit mapped by the first physical unit and at least one second logical unit mapped by the second physical unit. The memory management circuit is further configured to perform a data merge operation according to the first logical distance value, so as to copy valid data from a source node among the physical units to a recycling node among the physical units.

Based on the above, after the first logical distance value between the first physical unit and the second physical unit is obtained, the data merge operation may be performed according to the first logical distance value to copy the valid data from the source node to the recycling node. By considering the logical dispersion degree between the first logical unit mapped by the first physical unit and the second logical unit mapped by the second physical unit, the access count of the memory storage device during the data merge operation may be significantly reduced and the lifetime of the memory storage device may be extended.

To make the aforementioned and other features of the disclosure more comprehensible, several embodiments accompanied with drawings are described in detail as follows.

It should be understood, however, that this Summary may not contain all of the aspects and embodiments of the present disclosure, is not meant to be limiting or restrictive in any manner, and that the disclosure as disclosed herein is and may be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
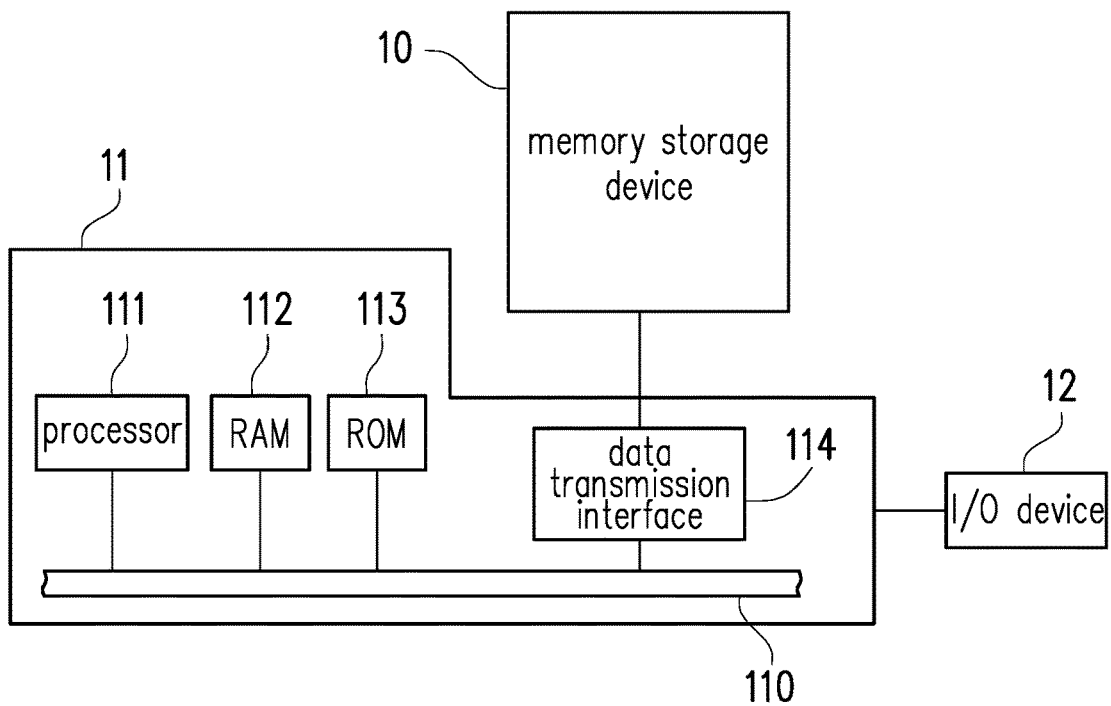
FIG. 1 is a schematic diagram of a host system, a memory storage device, and an input/output (I/O) device according to an exemplary embodiment of the disclosure.

Reference may now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" may be used interchangeably herein.

Generally, a memory storage device (also referred to as a memory storage system) includes a rewritable non-volatile memory module and a controller (also referred to as a control circuit). The memory storage device is normally used together with a host system, allowing the host system to write data to the memory storage device or read data from the memory storage device.

Figure 2:
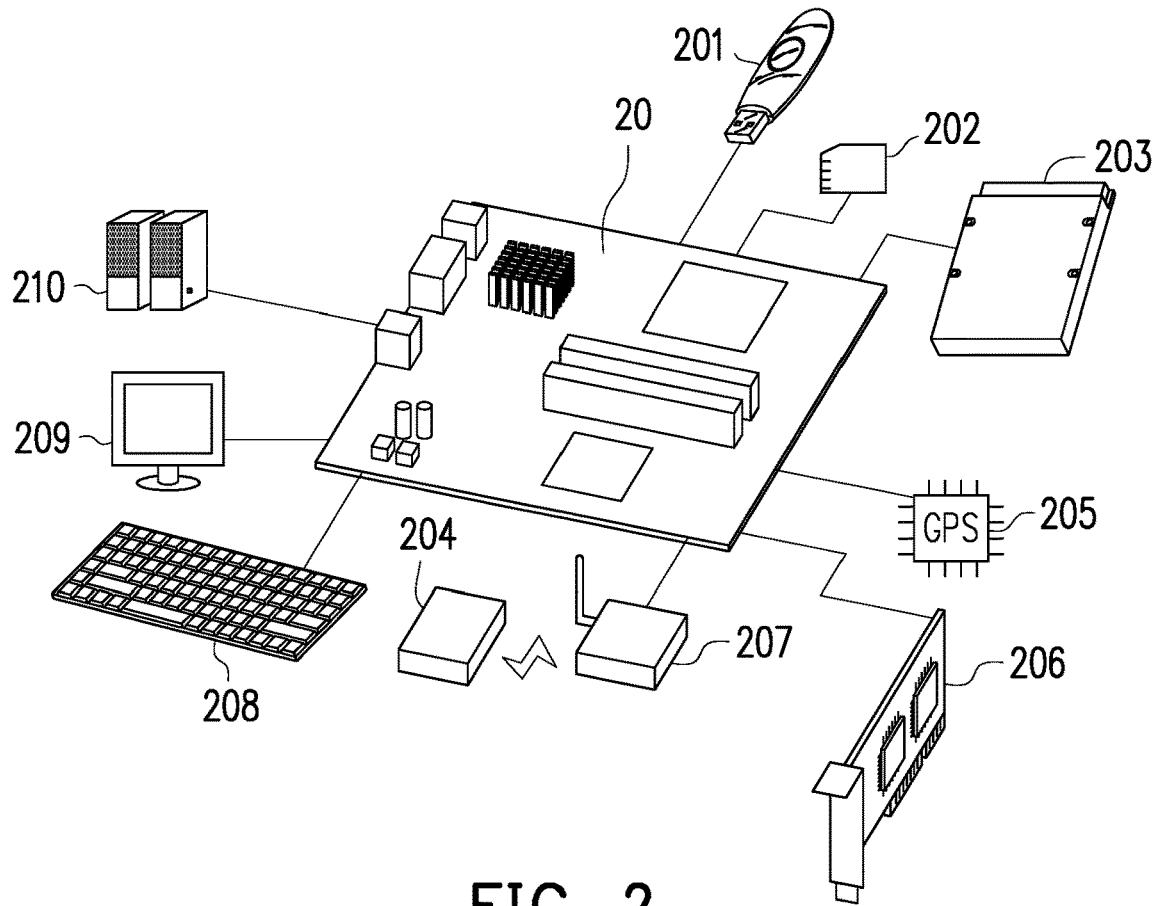
FIG. 2 is a schematic diagram of a host system, a memory storage device, and an I/O device according to another exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to another exemplary embodiment of the disclosure.

Please refer to FIG. 1 and FIG. 2, a host system 11 normally includes a processor 111, a random access memory (RAM) 112, a read only memory (ROM) 113, and a data transmission interface 114. The processor 111, the random access memory 112, the read only memory 113, and the data transmission interface 114 are all coupled to a system bus 110.

In the exemplary embodiment, the host system 11 is coupled to a memory storage device 10 through the data transmission interface 114. For example, the host system 11 may store data to the memory storage device 10 or read data from the memory storage device 10 via the data transmission interface 114. In addition, the host system 11 is coupled to an I/O device 12 through the system bus 110. For example, the host system 11 may transmit an output signal to the I/O device 12 or receive an input signal from the I/O device 12 via the system bus 110.

In the exemplary embodiment, the processor 111, the random access memory 112, the read-only memory 113, and the data transmission interface 114 may be disposed on a motherboard 20 of the host system 11. The number of data transmission interfaces 114 may be one or more. The motherboard 20 may be coupled to the memory storage device 10 via a wired or a wireless method through the data transmission interface 114. The memory storage device 10 may be, for example, a flash drive 201, a memory card 202, a Solid State Drive (SSD) 203, or a wireless memory storage device 204. The wireless memory storage device 204 may be, for example, a Near Field Communication (NFC) memory storage device, a wireless fidelity (WiFi) memory storage device, a Bluetooth memory storage device, a Bluetooth low energy (BLE) memory storage device (e.g. iBeacon), or other memory storage devices based on various types of wireless communication technologies. In addition, the motherboard 20 may also be coupled to a Global Positioning System (GPS) module 205, a network interface card 206, a wireless transmission device 207, a keyboard 208, a screen 209, a speaker 210, or other types of I/O devices through the system bus 110. For example, in an exemplary embodiment, the motherboard 20 may access the wireless memory storage device 204 through the wireless transmission device 207.

Figure 3:
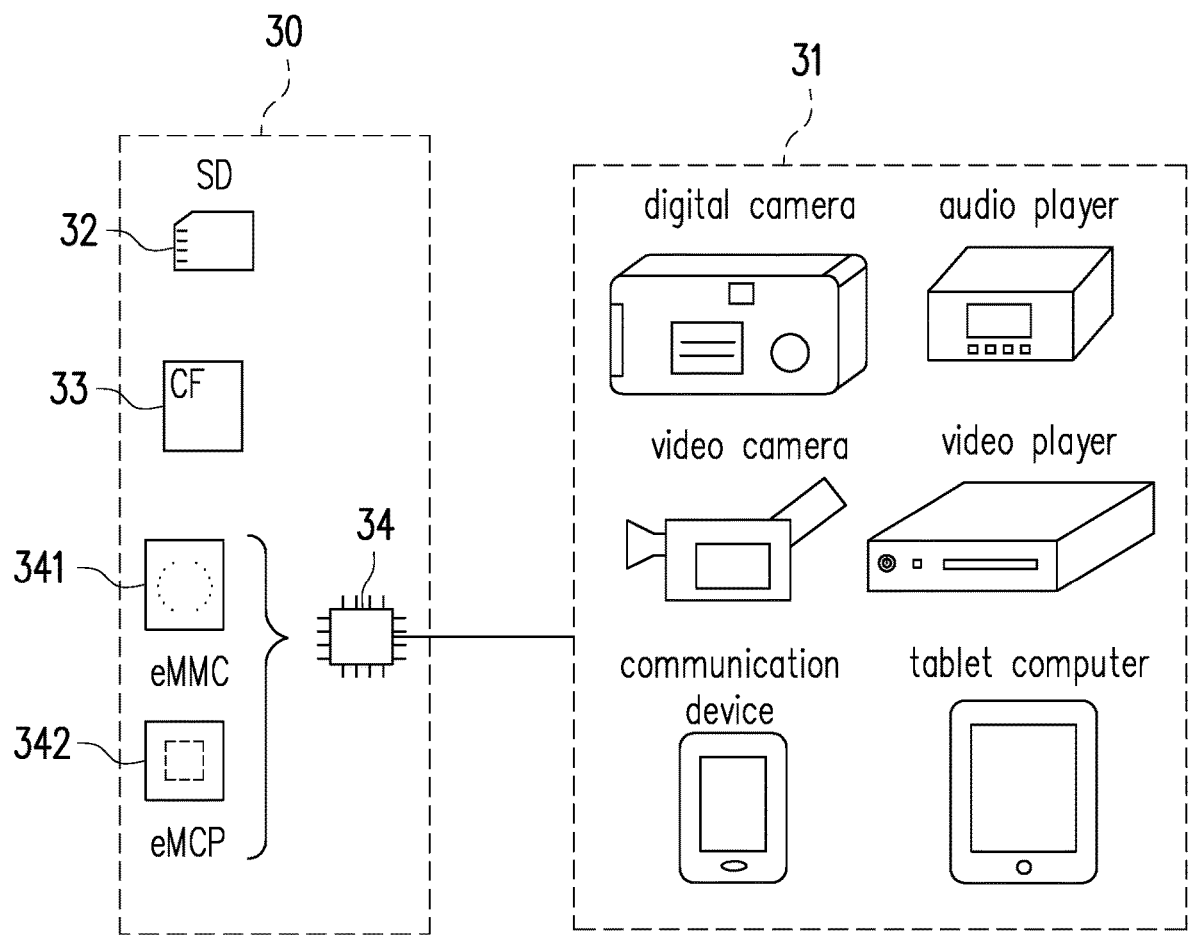
FIG. 3 is a schematic diagram of a host system and a memory storage device according to another exemplary embodiment of the disclosure.

In an exemplary embodiment, the host system mentioned may be any system that may substantially work with a memory storage device to store data. Although in the exemplary embodiments above, a computer system is used as the host system for illustration, FIG. 3 is a schematic diagram of a host system and a memory storage device according to another exemplary embodiment of the disclosure. Please refer to FIG. 3, in another exemplary embodiment, a host system 31 may also be a digital camera, a video camera, a communication device, an audio player, a video player, a tablet computer, or other systems. A memory storage device 30 may be a Secure Digital (SD) card 32, a Compact Flash (CF) card 33, an embedded storage device 34, or other types of non-volatile memory storage devices used by the host system 31. The embedded storage device 34 includes an embedded Multi Media Card (eMMC) 341, and/or an embedded Multi Chip Package (eMCP) storage device 342, or various types of embedded storage devices which directly couple a memory module onto a substrate of a host system.

Figure 4:
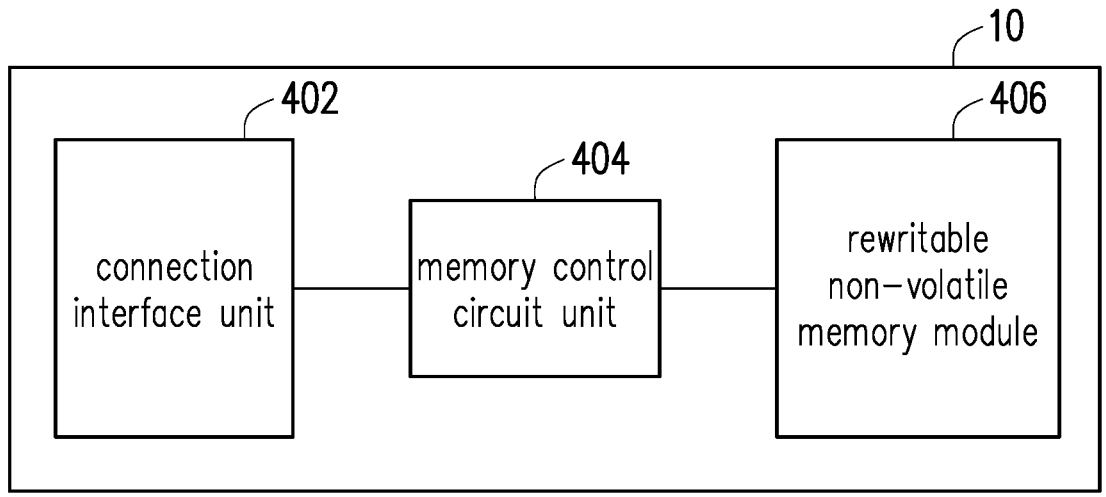
FIG. 4 is a functional block diagram of a memory storage device according to an exemplary embodiment of the disclosure.

FIG. 4 is a functional block diagram of a memory storage device according to an exemplary embodiment of the disclosure.

Please refer to FIG. 4, the memory storage device 10 includes a connection interface unit 402, a memory control circuit unit 404, and a rewritable non-volatile memory module 406.

The connection interface unit 402 is configured to couple the memory storage device 10 to the host system 11. The memory storage device 10 may communicate with the host system 11 through the connection interface unit 402. In the exemplary embodiment, the connection interface unit 402 is compatible with the Serial Advanced Technology Attachment (SATA) standard. However, it must be understood that the disclosure is not limited thereto. The connection interface unit 402 may also be compatible with the Parallel Advanced Technology Attachment (PATA) standard, the Institute of Electrical and Electronic Engineers (IEEE) 1394 standard, the Peripheral Component Interconnect Express (PCI Express) standard, the Universal Serial Bus (USB) standard, the SD interface standard, the Ultra High Speed-I (UHS-I) interface standard, the Ultra High Speed II (UHS-II) interface standard, the Memory Stick (MS) interface standard, the MCP interface standard, the MMC interface standard, the eMMC interface standard, the Universal Flash Storage (UFS) interface standard, the eMCP interface standard, the CF interface standard, the Integrated Device Electronics (IDE) standard, or other suitable standards. The connection interface unit 402 may be packaged in one chip with the memory control circuit unit 404 or the connection interface unit 402 may be disposed outside a chip containing the memory control circuit unit 404.

The memory control circuit unit 404 is configured to perform multiple logic gates or control commands implemented using a hardware type or a firmware type and execute operations such as writing, reading, and erasing of data in the rewritable non-volatile memory module 406 according to the command of the host system 11.

The rewritable non-volatile memory module 406 is coupled to the memory control circuit unit 404 and is configured to store data written by the host system 11. The rewritable non-volatile memory module 406 may be a Single Level Cell (SLC) NAND flash memory module (i.e., a flash memory module which stores 1-bit in one memory cell), a Multi Level Cell (MLC) NAND flash memory module (i.e., a flash memory module which stores 2-bits in one memory cell), a Triple Level Cell (TLC) NAND flash memory module (i.e., a flash memory module which stores 3-bits in one memory cell), a Quad Level Cell (QLC) NAND flash memory module (i.e., a flash memory module which stores 4-bits in one memory cell), other flash memory modules, or other memory modules with the same characteristic.

Each memory cell of the rewritable non-volatile memory modules 406 stores one or more bits based on a change of voltage (also referred to as a threshold voltage hereinafter). Specifically, there is a charge trapping layer between a control gate and a channel of each memory cell. Through applying a write voltage to the control gate, the number of electrons in the charge trapping layer may be changed, thereby changing the threshold voltage of the memory cell. The operation of changing the threshold voltage of the memory cell is also referred to as "writing data into the memory cell" or "programming the memory cell". As the threshold voltage changes, each memory cell of the rewritable non-volatile memory module 406 has multiple storage states. Through applying a read voltage, the storage state to which a memory cell belongs may be determined, thereby obtaining one or more bits stored by the memory cell.

In the exemplary embodiment, the memory cells of the rewritable non-volatile memory module 406 constitute multiple physical programming units, and the physical programming units constitute multiple physical erasing units. Specifically, the memory cells on the same word line form one or more physical programming units. If each memory cell may store two bits or more than 2 bits, then the physical programming units on the same word line may at least be classified into a lower physical programming unit and an upper physical programming unit. For example, a Least Significant Bit (LSB) of a memory cell belongs to the lower physical programming unit while a Most Significant Bit (MSB) of a memory cell belongs to the upper physical programming unit. Generally, in an MLC NAND flash memory, the write speed of the lower physical programming unit is greater than the write speed of the upper physical programming unit, and/or the reliability of the lower physical programming unit is higher than the reliability of the upper physical programming unit.

In the exemplary embodiment, the physical programming unit is the smallest unit of programming. That is, the physical programming unit is the smallest unit of write data. For example, the physical programming unit is a physical page or a physical sector. If the physical programming unit is a physical page, then the physical programming units normally include a data bit region and a redundancy bit region. The data bit region includes multiple physical sectors for storing user data while the redundancy bit region is for storing system data (e.g. management data such as error correction codes, etc.). In the exemplary embodiment, the data bit region contains 32 physical sectors, and the size of one physical sector is 512 bytes (B). However, in other exemplary embodiments, a data bit region may also contain 8, 16, a higher number, or a lower number of physical sectors, and the size of each physical sector may also be larger or smaller. On the other hand, the physical erasing unit is the smallest unit of erase. That is, each physical erasing unit includes the smallest number of memory cells erased together. For example, the physical erasing unit is a physical block.

Figure 5:
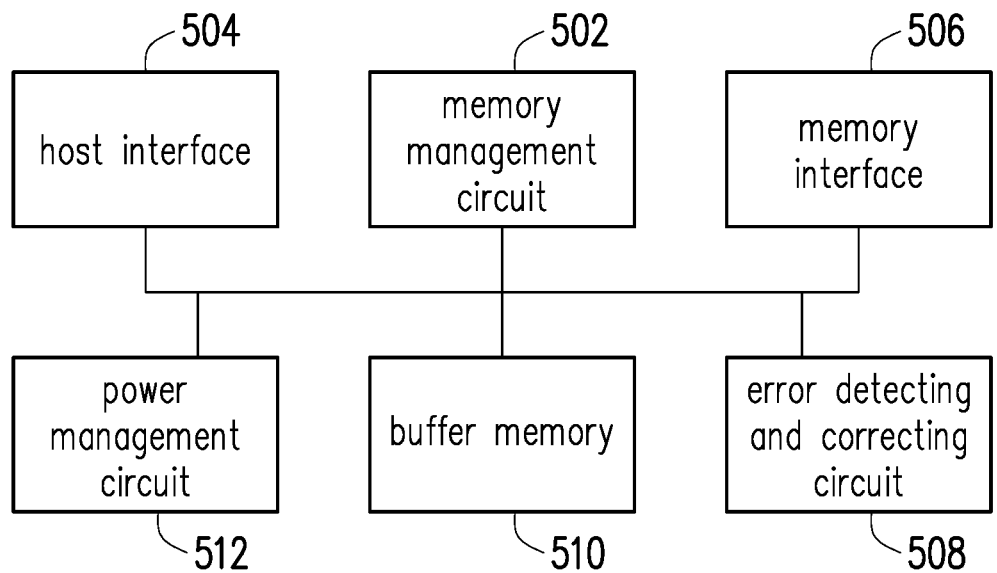
FIG. 5 is a functional block diagram of a memory control circuit unit according to an exemplary embodiment of the disclosure.

FIG. 5 is a functional block diagram of a memory control circuit unit according to an exemplary embodiment of the disclosure.

Please refer to FIG. 5, the memory control circuit unit 404 includes a memory management circuit 502, a host interface 504, and a memory interface 506.

The memory management circuit 502 is configured to control the overall operation of the memory control circuit unit 404. Specifically, the memory management circuit 502 has multiple control commands. When the memory storage device 10 operates, the control commands are performed to carry out operations such as writing, reading, and erasing of data. The illustration of operation of the memory management circuit 502 below may be equivalent to the illustration of operation of the memory control circuit unit 404.

In the exemplary embodiment, the control commands of the memory management circuit 502 are implemented using a firmware form. For example, the memory management circuit 502 has a microprocessor unit (not shown) and a read only memory (not shown), and the control commands are burnt into the read only memory. When the memory storage device 10 operates, the control commands are performed by the microprocessor unit to carry out operations such as writing, reading, and erasing of data.

In another exemplary embodiment, the control commands of the memory management circuit 502 may also be stored in a specific area of the rewritable non-volatile memory module 406 (e.g. a system area in the memory module dedicated to storage of system data) as a program code. In addition, the memory management circuit 502 has a microprocessor unit (not shown), a read only memory (not shown), and a random access memory (not shown). In particular, the read only memory has a boot code. When the memory control circuit unit 404 is enabled, the microprocessor unit first performs the boot code to load the control commands stored in the rewritable non-volatile memory module into the random access memory of the memory management circuit 502. Then, the microprocessor unit may run the control commands to carry out operations such as writing, reading, and erasing of data.

In addition, in another exemplary embodiment, the control commands of the memory management circuit 502 may also be implemented using a hardware form. For example, the memory management circuit 502 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage memory cells of the rewritable non-volatile memory module 406 or a group thereof. The memory write circuit is configured to issue a write command sequence to the rewritable non-volatile memory module 406 to write data into the rewritable non-volatile memory module 406. The memory read circuit is configured to issue a read command sequence to the rewritable non-volatile memory module 406 to read data from the rewritable non-volatile memory module 406. The memory erase circuit is configured to issue an erase command sequence to the rewritable non-volatile memory module 406 to erase data from the rewritable non-volatile memory module 406. The data processing circuit is configured to process the data to be written to the rewritable non-volatile memory module 406 and the data read from the rewritable non-volatile memory module 406. The write command sequence, the read command sequence, and the erase command sequence may each include one or more program code or command code, and are for instructing the rewritable non-volatile memory module 406 to perform the corresponding write, read, erase, etc. operations. In an exemplary embodiment, the memory management circuit 502 may also issue other types of command sequences to the rewritable non-volatile memory module 406 to instruct performance of the corresponding operation.

The host interface 504 is coupled to the memory management circuit 502. The memory management circuit 502 may communicate with the host system 11 through the host interface 504. The host interface 504 is configured to receive and identify commands and data transmitted by the host system 11. For example, the commands and the data transmitted by the host system 11 are transmitted to the memory management circuit 502 through the host interface 504. Furthermore, the memory management circuit 502 may transmit data to the host system 11 through the host interface 504. In the exemplary embodiment, the host interface 504 is compatible with the SATA standard. However, it must be understood that the disclosure is not limited thereto, and the host interface 504 may also be compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other standards suitable for data transmission.

The memory interface 506 is coupled to the memory management circuit 502 and is configured to access the rewritable non-volatile memory module 406. In other words, the data to be written to the rewritable non-volatile memory module 406 is converted to a format acceptable to the rewritable non-volatile memory module 406 via the memory interface 506. Specifically, if the memory management circuit 502 is to access the rewritable non-volatile memory module 406, the memory interface 506 may transmit a corresponding command sequence. For example, the command sequences may include a write command sequence instructing a writing of data, a read command sequence instructing a reading of data, an erase command sequence instructing an erasing of data, and corresponding command sequences for instructing various types of memory operations (e.g. changing read voltage level, performing garbage collection operation, etc.). The command sequences are generated, for example, by the memory management circuit 502 and transmitted to the rewritable non-volatile memory module 406 through the memory interface 506. The command sequences may include one or more signals, or data on the system bus. The signals or data may include command codes or program codes. For example, in the read command sequence, information such as a read identification code, a memory address, etc. are included.

In an exemplary embodiment, the memory control circuit unit 404 further includes an error checking and correcting circuit 508, a buffer memory 510, and a power management circuit 512.

The error checking and correcting circuit 508 is coupled to the memory management circuit 502 and is configured to perform error checking and correcting operations to ensure correctness of data. Specifically, when the memory management circuit 502 receives a write command from the host system 11, the error checking and correcting circuit 508 may generate an error correcting code (ECC) and/or an error detecting code (EDC) for the data corresponding to the write command. Also, the memory management circuit 502 may write the data corresponding to the write command and the corresponding error correcting code and/or error detecting code into the rewritable non-volatile memory module 406. Then, when the memory management circuit 502 reads data from the rewritable non-volatile memory module 406, the error correcting code and/or the error detecting code corresponding to the data are read simultaneously. Also, the error checking and correcting circuit 508 may perform an error checking and correcting operation to the read data based on the error correcting code and/or error detecting code.

The buffer memory 510 is coupled to the memory management circuit 502 and is configured to temporarily store data and commands from the host system 11 or data from the rewritable non-volatile memory module 406. The power management circuit 512 is coupled to the memory management circuit 502 and is configured to control the power of the memory storage device 10.

In an exemplary embodiment, the rewritable non-volatile memory module 406 of FIG. 4 is also referred to as a flash memory module, the memory control circuit unit 404 of FIG. 4 is also referred to as a flash memory controller configured to control the flash memory module, and/or the memory management circuit 502 of FIG. 5 is also referred to as a flash memory management circuit.

Figure 6:
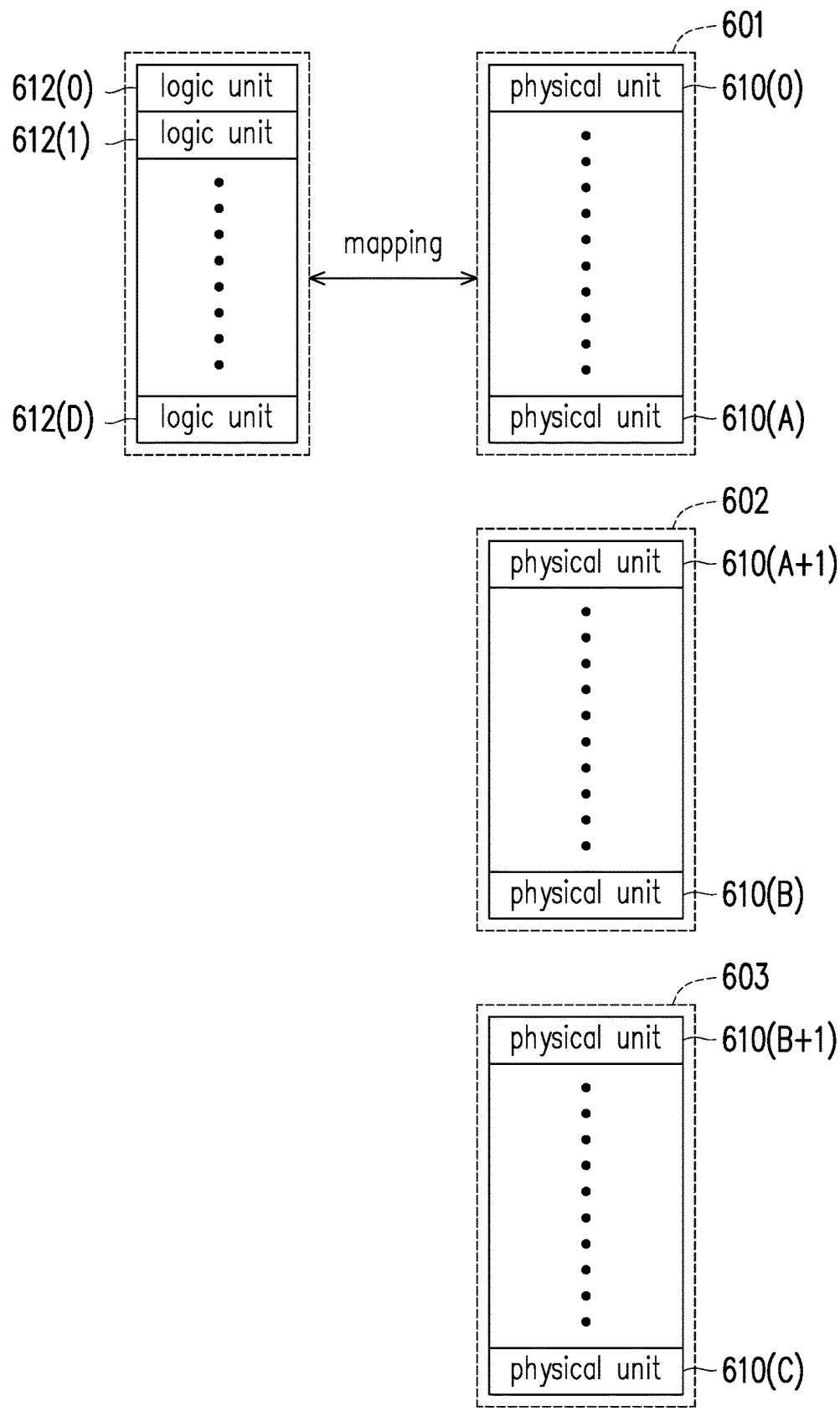
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure.

Please refer to FIG. 6, the memory management circuit 502 may logically group physical units 610(0)-610(C) of the rewritable non-volatile memory module 406 into a storage region 601, a spare region 602, and a system region 603. Physical units 610(0)-610(A) in the storage region 601 is configured to store data. For example, the physical unit 610(0)-610(A) in the storage region 601 may store valid data and invalid data. Physical units 610(A+1)-610(B) in the spare region 602 have yet been used to store data (e.g. valid data). Physical units 610(B+1)-610(C) in the system region 603 are configured to store system data, such as a logical-to-physical mapping table, a bad block management table, a device model, or other types of management data.

The memory management circuit 502 may select a physical unit from the physical units 610(A+1)-610(B) of the spare region 602 and store data from the host system 11 or from at least one physical unit of the storage region 601 into the selected physical unit. Then, the selected physical unit may be associated to the storage region 601. In addition, after erasing a certain physical unit in the storage region 601, the erased physical unit is re-associated to the spare region 602.

In the exemplary embodiment, each physical unit belonging to the storage region 601 is also referred to as a non-spare physical unit while each physical unit belonging to the spare region 602 is also referred to as a spare physical unit. In the exemplary embodiment, a physical unit refers to one physical erasing unit. However, in another exemplary embodiment, a physical unit may also contain multiple physical erasing units.

The memory management circuit 502 may assign logical units 612(0)-612(D) to map the physical units 610(0)-610(A) in the storage region 601. In the exemplary embodiment, each logical unit refers to a logical address. However, in another embodiment, a logical unit may also refer to a logic programming unit, a logic erasing unit, or include multiple continuous or non-continuous logical addresses. Moreover, each of the logical units 612(0)-612(D) may be mapped to one or more physical units. It is noted that, in an exemplary embodiment, the memory management circuit 502 may not assign any logical unit mapped to the system region 603 to prevent the system data stored in the system region 603 from being modified by the user.

The memory management circuit 502 records mapping information (also referred to as logical-to-physical mapping information) between the logical units and the physical units to at least one logical-to-physical mapping table. The mapping information reflects a mapping relationship between a specific physical unit of the storage region 601 and a specific logical unit. The logical-to-physical mapping table is stored in the physical units 610(B+1)-610(C) of the system region 603. The memory management circuit 502 may obtain the mapping relationship between the specific physical unit of the storage region 601 and the specific logical unit according to a specific logical-to-physical mapping table. The memory management circuit 502 may access this specific physical unit according to the mapping relationship.

It is noted that in the following description, some terms may be replaced with corresponding abbreviations for ease of reading (see Table 1).

TABLE 1

| | |
|---|---|
| rewritable non-volatile memory module | RNVM module |
| memory management circuit | MMC |
| physical unit | PU |
| logical unit | LU |
| logical-to-physical mapping information | L2P information |
| logical-to-physical mapping table | L2P table |
| logical distance value | LDV |
| table mapping information | TMI |
| table difference information | TDI |

In the exemplary embodiment, valid data is the newest data belonging to a LU while invalid data is not the newest data belonging to any LU. For example, if the host system 11 stores new data to a certain LU and overwrites the old data originally stored in this LU (i.e., the data belonging to this LU is updated), then the new data stored in the storage region 601 is the newest data belonging to the LU and is marked as valid while the old data which is overwritten may still be stored in the storage region 601 but is marked as invalid.

In the exemplary embodiment, if the data belonging to a certain LU is updated, then the mapping relationship between this LU and the PU storing the old data belonging to this LU is removed, and the mapping relationship between this LU and the PU storing the newest data belonging to this LU is established. However, in another exemplary embodiment, if the data belonging to a certain LU is updated, then the mapping relationship between this LU and the PU storing the old data belonging to this LU may still be maintained.

When the memory storage device 10 is ex-factory, the total number of PUs belonging to the spare region 602 may be a preset number (e.g. 30). During the operation of the memory storage device 10, more and more PUs are selected from the spare region 602 and associated to the storage region 601 to store data (e.g. user data from the host system 11). Therefore, the total number of PUs belonging to the spare region 602 may gradually decrease with respect to the use of the memory storage device 10.

During the operation of the memory storage device 10, the MMC 502 may update the total number of PUs belonging to the spare region 602 continuously. The MMC 502 may perform a data merge operation according to the number of PUs (i.e. the total number of spare PUs) in the spare region 602. For example, the MMC 502 may determine whether the total number of PUs belonging to the spare region 602 is less than or equal to a threshold value (also referred to as a first threshold value). The first threshold value is, for example, a value of 2 or more (e.g. 10), and the disclosure is not limited thereto. If the total number of PUs belonging to the spare region 602 is less than or equal to the first threshold value, the MMC 502 may perform the data merge operation. In an exemplary embodiment, the data merge operation is also referred to as a garbage collection operation.

In the data merge operation, the MMC 502 may select at least one PU from the storage region 601 as the source node. The MMC 502 may copy the valid data from the selected PU (i.e., the source node) to at least one PU served as the recycling node. The PU (i.e., the recycling node) configured for storing the copied valid data is selected from the spare region 602 and is associated to the storage region 601. If all the valid data stored by a certain PU has been copied to the recycling node, then the PU may be erased and associated to the spare region 602. In an exemplary embodiment, the operation of re-associating a certain PU from the storage region 601 back to the spare region 602 (or the operation of erasing a PU) is also referred to as releasing a spare PU. By performing the data merge operation, one or more spare PUs may be released, allowing the total number of PUs belonging to the spare region 602 to gradually increase.

After the data merge operation has begun, if the PUs belonging to the spare region 602 meet a specific condition, the data merge operation may be stopped. For example, the MMC 502 may determine whether the total number of PUs belonging to the spare region 602 is greater than or equal to a threshold value (also referred to as a second threshold value). For example, the second threshold value may be greater than or equal to the first threshold value. If the total number of PUs belonging to the spare region 602 is greater than or equal to the second threshold value, the MMC 502 may stop the data merge operation. It is noted that, stopping the data merge operation refers to ending the current data merge operation being performed. After stopping one data merge operation, if the total number of PUs belonging to the spare region 602 is less than or equal to the first threshold value again, then a next data merge operation may be executed again in attempting to release new spare PUs.

Figure 7:
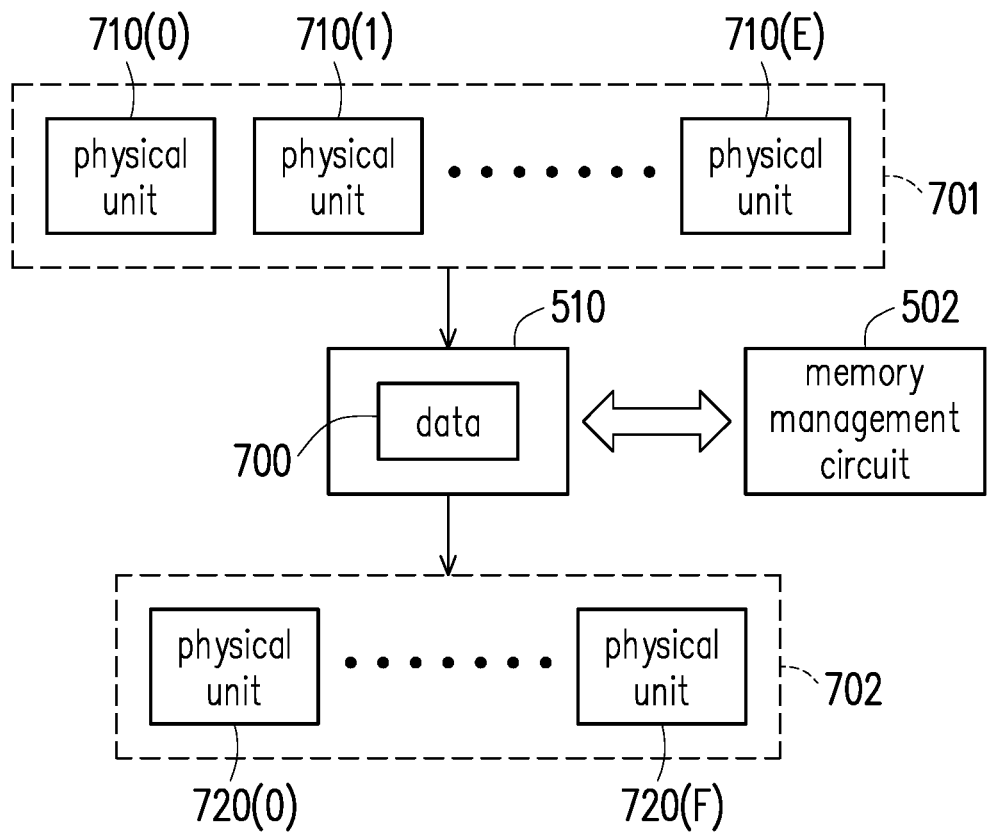
FIG. 7 is a schematic diagram of a data merge operation according to an exemplary embodiment of the disclosure.

FIG. 7 is a schematic diagram of a data merge operation according to an exemplary embodiment of the disclosure.

Referring to FIG. 7, in a data merge operation, the MMC 502 may instruct a collecting of data 700 from the PUs 710(0)-710(E) served as source node 701 and temporarily store the data 700 in the buffer memory 510. The PUs 710(0)-710(E) belonging to the source node 701 are selected from the storage region 601 of FIG. 6. The data 700 is valid data. The MMC 502 may then instruct a writing of the data 700 to the PUs 720(0)-720(F) served as recycle node 702. The PUs 720(0)-720(F) belonging to the recycling node 702 are selected from the spare region 602 of FIG. 6. In other words, in the data merge operation, the data 700 may be copied from the PUs 710(0)-710(E) served as the source node 701 to the PUs 720(0)-720(F) served as the recycle node 702.

In an exemplary embodiment, the MMC 502 may select one or more PUs from the storage region 601 as the source node 701 of the valid data according to LDVs between multiple PUs in the storage region 601 of FIG. 6. For example, it is assumed that, a PU 610(0) (also referred to as a first PU) maps to one or more LUs (also referred to as first LUs) and a PU 610(1) (also referred to as a second PU) maps to one or more LUs (also referred to as second LUs). A LDV (also referred to as a first LDV) between the PUs 610(0) and 610(1) may reflect a dispersion degree (also referred to as a first logical dispersion degree) between the first LU and the second LU. For example, the first LDV may be positively correlated with this logical dispersion degree. For example, the larger the first LDV is, the larger the logical dispersion degree between the first LU and the second LU is.

In an exemplary embodiment, the logical dispersion degree between the first LU and the second LU is related to a concentration degree (or proximity) of serial numbers of the first LU and the second LU. Assuming that the serial numbers of the first LU and the second LU are more concentrated or closer (for example, the serial numbers of the first LU and the second LU both fall within a certain number range), then it may be determined that the logical dispersion degree of the first LU and the second logical is relatively small. Alternatively, assuming that the serial numbers of the first LU and the second LU are more scattered or not closing to each other (for example, the serial number of the first LU falls within a certain number range, and the serial number of the second LU falls within another number range), then it may be determined that the logical dispersion degree of the first LU and the second LU is relatively large. In an exemplary embodiment, a plurality of LUs that are consecutively numbered may have a smaller logical dispersion degree therebetween, and a plurality of LUs that are not consecutively numbered may have a larger logical dispersion degree therebetween.

In an example embodiment, the MMC 502 may preferentially select a plurality of PUs having the smallest LDV therebetween in the storage region 601 of FIG. 6 as the source node 701. In an example embodiment, the MMC 502 may preferentially select a plurality of PUs having a smaller LDV therebetween in the storage region 601 of FIG. 6 as the source node 701. For example, if it is assumed that, a LDV (i.e., the first LDV) between the PUs 610(0) and 610(1) is 5, and a LDV (also referred to as a second LDV) between the PUs 610(0) and 610(A) (also referred to as a third PU) is 1, then the MMC 502 may compare the first LDV with the second LDV. According to the comparison result, the MMC 502 may preferentially select the PU 610(0) and the PU 610(A) as the source node 701. Alternatively, if the LDV between the PUs 610(0) and 610(1) is 2, and the LDV between PUs 610(0) and 610(A) is 3, then the MMC 502 may preferentially select the PU 610(0) and the PU 610(1) as the source node 701.

In an exemplary embodiment, the MMC 502 may preferentially select a plurality of PUs having a LDV less than a target distance value therebetween in the storage region 601 of FIG. 6 as the source node 701. For example, if it is assumed that, the target distance value is 3 and the LDV (i.e., the first LDV) between the PUs 610(0) and 610(1) is 2, then the MMC 502 may preferentially select the PUs 610(0) and 610(1) as the source node 701 according to a compare result between the first LDV and the target distance value (i.e., the first LDV is not greater than the target distance value). Alternatively, if the first LDV (e.g., 5) is greater than the target distance value (e.g., 3), then the MMC 502 may not select the PU 610(0) and/or the PU 610(1) as the source node 701.

In an exemplary embodiment, the MMC 502 may set the target distance value according to the LDV (i.e., the second LDV) between the PU 610(0) and the PU 610(A) in FIG. 6. For example, the MMC 502 may directly set the second LDV as the target distance value. Alternatively, in an exemplary embodiment, the MMC 502 may set the target distance value based on the LDVs between all or at least some of the PUs in the storage region 601 of FIG. 6. For example, the target distance value may be an average value of the LDVs between all or at least some of the PUs in the storage region 601. The MMC 502 may determine whether to select the PU 610(0) and/or the PU 610(1) as the source node 701 according to whether the LDV (i.e., the first LDV) between the PUs 610(0) and 610(1) is greater than the target distance value.

In an exemplary embodiment, the MMC 502 may also select one or more PUs as the source node 701 from the storage region 601 of FIG. 6 in consideration of other rules. For example, the MMC 502 may select one or more PUs as the source node 701 according to data amount of valid data stored by at least some of the PUs in the storage region 601 and the LDVs between these PUs. For example, in an exemplary embodiment, the MMC 502 may select a plurality of PUs as candidate PUs according to the data amount of valid data stored by at least some of the PUs in the storage region 601. Then, the MMC 502 may select one or more PUs as the source node 701 from these candidate PUs according to the LDVs between these candidate PUs. Alternatively, in an exemplary embodiment, the MMC 502 may select a plurality of PUs as candidate PUs according to LDVs between at least some of the PUs in the storage region 601. Then, the MMC 502 may select one or more PUs as the source node 701 from these candidate PUs according to the data amount of the valid data stored by these candidate PUs. Thereby, the MMC 502 may preferentially select the PUs having a smaller LDV therebetween and/or storing less valid data as the source node 701.

In an exemplary embodiment, L2P information of the first LU is recorded in at least one L2P table (also referred to as a first L2P table). For example, the L2P information of the first LU may reflect the mapping relationship between the first LU and the PU 610(0) (i.e., the first PU) of FIG. 6. The L2P information of the second LU is recorded in at least one L2P table (also referred to as a second L2P table). For example, the L2P information of the second LU may reflect the mapping relationship between the second LU and the PU 610(1) (i.e., the second PU) of FIG. 6. In an exemplary embodiment, the first LDV further reflects an overlapping degree between the first L2P table and the second L2P table. For example, more tables between the first L2P table and the second L2P table being repeated or overlapped, the higher the overlapping degree between the first L2P table and the second L2P tables is.

In an exemplary embodiment, the overlapping degree between the first L2P table and the second L2P table is negatively related to the LDV between the first PU and the second PU. That is, if the overlapping degree between the first L2P table and the second L2P table is higher, the LDV between the first PU and the second PU is smaller. The MMC 502 may select one or more PUs as the source node 701 according to the overlapping degree between the first L2P table and the second L2P table and execute the data merge operation.

Figure 8:
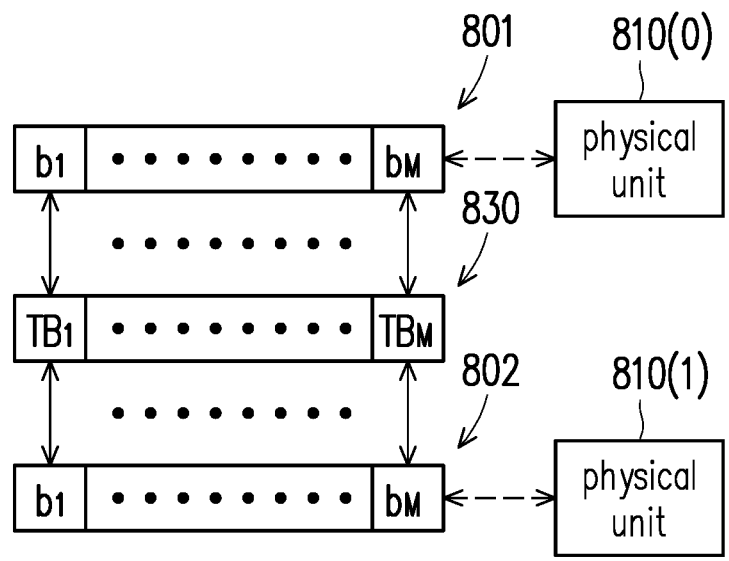
FIG. 8 is a schematic diagram of table mapping information according to an exemplary embodiment of the disclosure.

FIG. 8 is a schematic diagram of TMI according to an exemplary embodiment of the disclosure.

Referring to FIG. 8, TMI 801 corresponds to PU 810(0), and TMI 802 corresponds to PU 810(1). The L2P table 830 may be stored in the system region 603 of FIG. 6. The L2P table 830 includes L2P tables $TB_1$-$TB_M$. The L2P tables $TB_1$-$TB_M$ are respectively used to record L2P information of at least one LU within a certain serial number range.

The TMI 801 may reflect that L2P information of a LU mapped by the PU 810(0) is stored in at least one of the L2P tables $TB_1$-$TB_M$. The TMI 802 may reflect that L2P information of a LU mapped by the PU 810(1) is stored in at least one of the L2P tables $TB_1$-$TB_M$. For example, the TMI 801 and 802 may both have bits $b_1$-$b_M$. The value of a bit $b_i$ can be 0 or 1 to reflect whether a L2P table $TB_i$ is being used. The value i is between 1 and M.

In an exemplary embodiment, if it is assumed that, the PU 810(0) is mapped to the LUs 612(1) and 612(3) of FIG. 6, then the values of the bits $b_1$ and $b_3$ in the TMI 801 may both be 1 (and the remaining bits may be 0), so as to reflect that the L2P information of the LUs 612(1) and 612(3) is recorded in the L2P tables $TB_1$ and $TB_3$. The L2P tables $TB_1$ and $TB_3$ may be loaded into the buffer memory 510 of FIG. 5 for accessing of the PU 810(0). Furthermore, if it is assumed that, the PU 810(1) is mapped to the LUs 612(1), 612(3), and 612(8) of FIG. 6, then the values of the bits $b_1$, $b_3$, and $b_8$ in the TMI 802 may all be 1 (and the remaining bits may be 0), so as to reflect that the L2P information of the LUs 612(1), 612(3), and 612(8) is recorded in the L2P tables $TB_1$, $TB_3$, and $TB_8$. The L2P tables $TB_1$, $TB_3$, and $TB_8$ may be loaded into the buffer memory 510 for accessing of the PU 810(1).

In the foregoing exemplary embodiments, the bits $b_1$ and $b_3$ in the TMI 801 and 802 are both 1, which means that the L2P tables $TB_1$ and $TB_3$ in these L2P tables used for accessing the PUs 810(0) and 810(1) are duplicated. When the PU 810(0) is to be accessed, the L2P tables $TB_1$ and $TB_3$ may be loaded into the buffer memory 510 for providing the related mapping information. Then, if the PU 810(1) is also to be accessed, only the L2P table $TB_8$ needs to be loaded in extra.

In an exemplary embodiment of FIG. 7, the MMC 502 may obtain the first LDV according to the TMI (also referred to as first TMI) corresponding to the first PU and the TMI (also referred to as second TMI) corresponding to the second PU. According to the first LDV, the MMC 502 may select a specific PU as the source node 701, so as to reduce the number of L2P tables that need to be loaded during the data merge operation. For example, by comparing the LDVs between at least a part of the PUs in the storage region 601 of FIG. 6 with the target distance value and then selecting the qualified PU as the source node 701, the number of accesses (i.e., the access count) to the RNVM module 406 of FIG. 4 may be effectively reduced, and the lifetime of the RNVM module 406 may be extended.

Figure 9A:
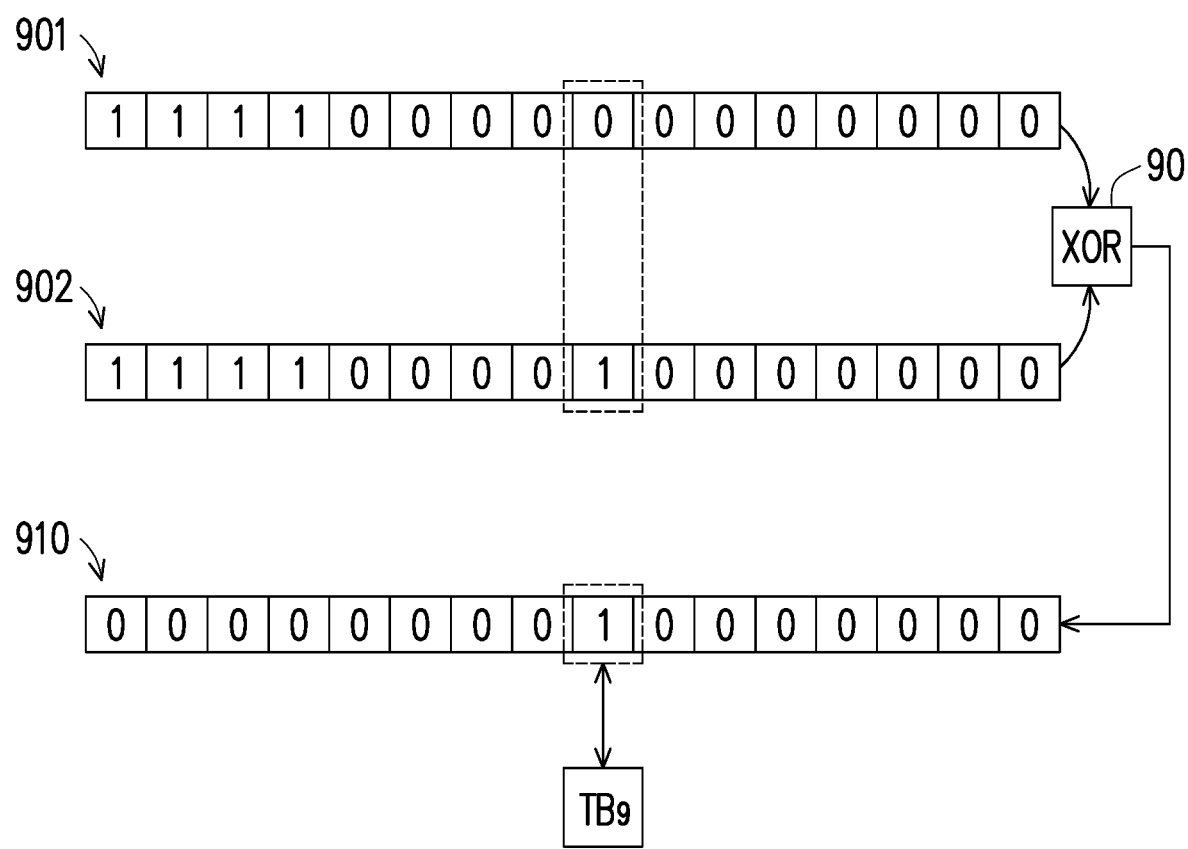
FIG. 9A and FIG. 9B are schematic diagrams of obtaining a logical distance value according to an exemplary embodiment of the disclosure.
Figure 9B:
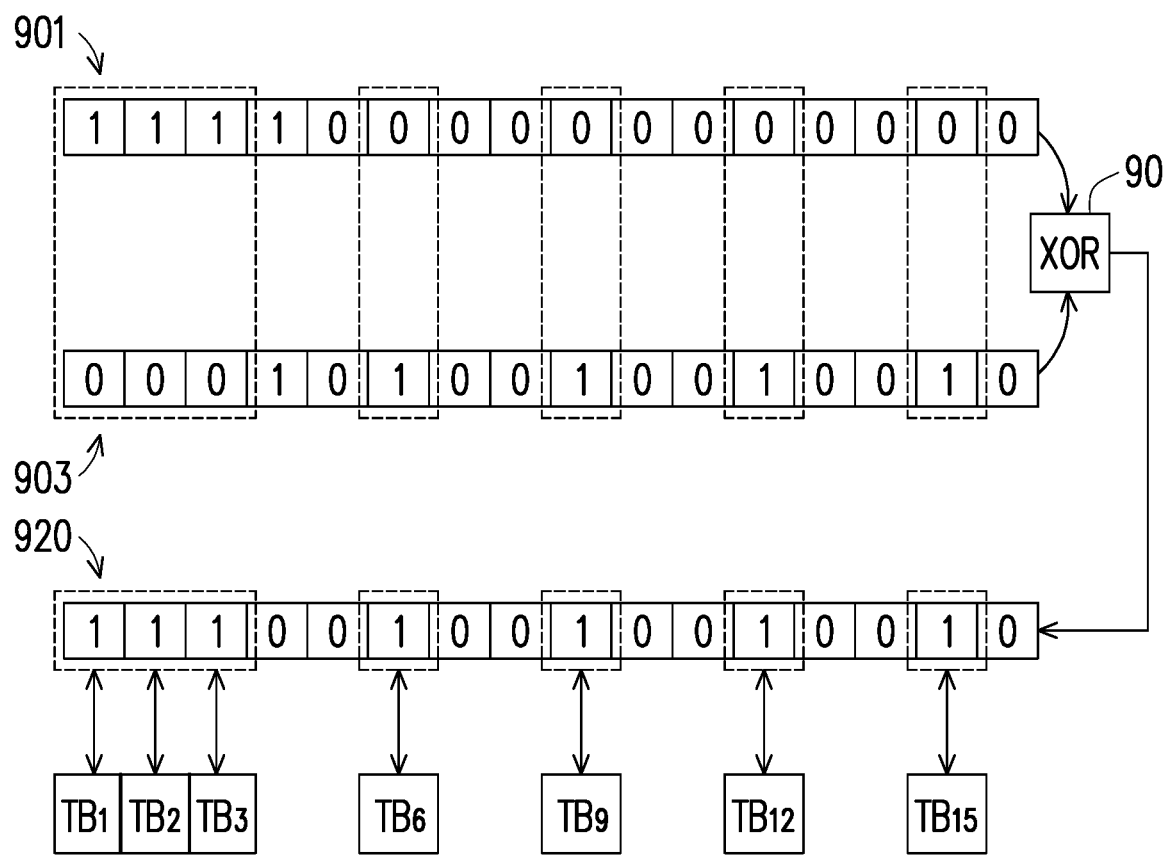

FIG. 9A and FIG. 9B are schematic diagrams of obtaining a LDV according to an exemplary embodiment of the disclosure.

Referring to FIG. 9A, it is assumed that, the TMI 901 corresponds to the first PU and the TMI 902 corresponds to the second PU. The TMI 901 and 902 both have 16 bits. The bits $b_1$-$b_4$ in the TMI 901 are 1, which reflect that the L2P table $TB_1$-$TB_4$ may be queried for accessing the first PU. The bits $b_1$-$b_4$ and $b_9$ in the TMI 902 are 1, which reflect that the L2P tables $TB_1$-$TB_4$ and $TB_9$ may be queried for accessing the second PU. After performing a first operation on the TMI 901 and 902 by a logic module 90, TDI 910 may be obtained. For example, the logic module 90 may perform an exclusive OR (XOR) operation on the bits b in both the TMI 901 and 902 to obtain a bit $b_j$ in the TDI 910. j is between 1 and 16. The TDI 910 may reflect the dispersion degree (i.e., the first logical dispersion degree) between the first LU and the second LU. In addition, the TDI 910 may also reflect the overlapping degree between the first L2P table and the second L2P table.

The first LDV between the first PU and the second PU may be obtained according to the TDI 910. For example, the first LDV may be obtained as 1 according to the total number of values 1 in the TDI 910. In the exemplary embodiment, the first LDV may reflect that there is (only) one L2P table (i.e., the L2P table $TB_9$) not overlapped between the first L2P table and the second L2P table.

Referring to FIG. 9B, it is assumed that TMI 903 corresponds to the third PU. The TMI 903 also has 16 bits. The bits $b_4$, $b_6$, $b_9$, $b_{12}$, and $b_{15}$ in the TMI 903 are 1, which reflect that the L2P tables $TB_4$, $TB_6$, $TB_9$, $TB_{12}$, and $TB_{15}$ may be queried to access the third PU. In other words, the TMI 903 may reflect that the L2P information of one or more LUs (also referred to as third LUs) mapped by the third PU is recorded in the L2P tables $TB_4$, $TB_6$, $TB_9$, $TB_{12}$, and $TB_{15}$. After the first operation is performed on the TMI 901 and 903 by the logic module 90, the TDI 920 may be obtained. For example, the logic module 90 may perform the XOR operation on the bits b in both the TMI 901 and 903 to obtain a bit $b_j$ in the TDI 920. j is between 1 and 16. The TDI 920 may reflect a dispersion degree (also referred to as a second logical dispersion degree) between the first LU and the third LU. In addition, the TDI 920 may also reflect an overlapping degree between the first L2P table and the L2P table (also referred to as third L2P table) which records the L2P information of the third LU.

A second LDV between the first PU and the third PU may be obtained according to the TDI 920. For example, the second LDV may be obtained according to the total number of values 1 in the TDI 920. In the exemplary embodiment, the second LDV may reflect that there are seven L2P tables (i.e., the L2P table $TB_1$-$TB_3$, $TB_6$, $TB_9$, $TB_{12}$ and $TB_{15}$) not overlapped between the first L2P table and the third L2P table. According to the first LDV and the second LDV, relative to the first PU and the third PU, the first PU and the second PU may be preferentially selected as the source node for collecting valid data (e.g., the source node 701 of FIG. 7). Thereby, the number of accesses to the RNVM module 406 of FIG. 4 in the data merge operation may be reduced.

Figure 10A:
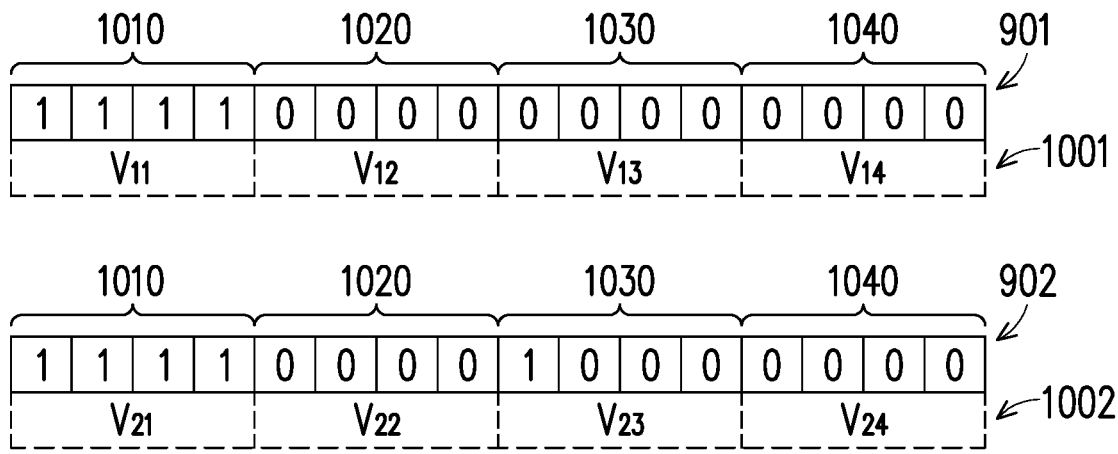
FIG. 10A and FIG. 10B are schematic diagrams of obtaining a logical distance value according to an exemplary embodiment of the disclosure.
Figure 10B:
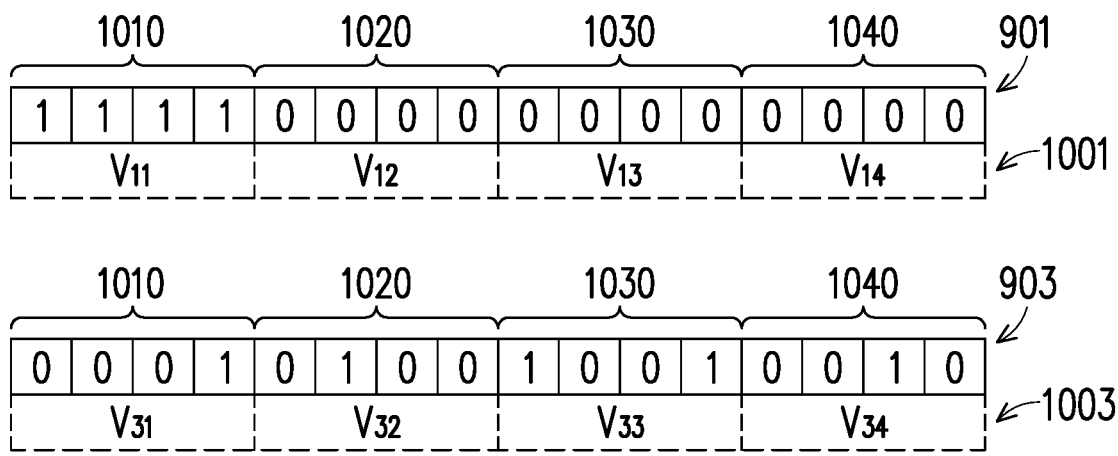

FIG. 10A and FIG. 10B are schematic diagrams of obtaining a LDV according to an exemplary embodiment of the disclosure.

Referring to FIG. 10A, in the exemplary embodiment, the TMI 901 may be replaced by TMI 1001, and the TMI 902 may be replaced by TMI 1002. The TMI 1001 includes values $V_{11}$ to $V_{14}$. The TMI 1002 includes values $V_{21}$ to $V_{24}$. The values $V_{11}$ to $V_{14}$ respectively reflect the total number of the values 1 in the four ranges 1010 to 1040 in the TMI 901. For example, the values $V_{11}$ to $V_{14}$ are 4, 0, 0, and 0, respectively. The values $V_{21}$ to $V_{24}$ respectively reflect the total number of the values 1 in the four ranges 1010 to 1040 in the TMI 902. For example, the values $V_{21}$ to $V_{24}$ are 4, 0, 1, and 0, respectively.

According to an N-dimensional distance (also referred to as an N-dimensional spatial distance) between the TMI 1001 and 1002, the first LDV between the first PU and the second PU may be obtained. In the exemplary embodiment, N is 4. For example, an N-dimensional distance LD1 between the TMI 1001 and 1002 may be obtained according to the following equation (1). The N-dimensional distance LD1 may be determined as the first LDV.

$$LD1 = \sqrt{(V_{21} - V_{11})^2 + (V_{22} - V_{12})^2 + (V_{23} - V_{13})^2 + (V_{24} - V_{14})^2} \quad (1.1)$$

Referring to FIG. 10B, in the exemplary embodiment, the TMI 903 may be replaced by TMI 1003. The TMI 1003 includes values $V_{31}$ to $V_{34}$. The values $V_{31}$ to $V_{34}$ respectively reflect the total number of the values 1 in the four ranges 1010 to 1040 in the TMI 903. For example, the values $V_{31}$ to $V_{34}$ are 1, 1, 2, and 1, respectively. According to an N-dimensional distance between the TMI 1001 and 1003, the second LDV between the first PU and the third PU may be obtained. For example, an N-dimensional distance LD2 between the TMI 1001 and 1003 may be obtained according to the following equation (1.2). The N-dimensional distance LD2 may be determined as the second LDV.

$$LD2 = \sqrt{(V_{31} - V_{11})^2 + (V_{32} - V_{12})^2 + (V_{33} - V_{13})^2 + (V_{34} - V_{14})^2} \quad (1.2)$$

According to the first LDV and the second LDV, the first PU and the second PU may be preferentially selected as the source node of the valid data (for example, the source node 701 of FIG. 7). Thereby, the number of accesses to the RNVM module 406 of FIG. 4 in the data merge operation may be reduced.

It is noted that, the exemplary embodiments of FIG. 9A to FIG. 10B are merely examples and are not intended to limit the disclosure. In another exemplary embodiment, the total number of bits included in the TMI may be more (e.g., 32-bits) or less (e.g., 8-bits). Other parameters may also be used to select the PU in the data merge operation as the source node of the valid data, as long as the number of accesses to the RNVM module 406 of FIG. 4 in the data merge operation may be reduced correspondingly. Further, the operation of obtaining the first LDV and/or the second LDV may be performed before or after the first PU is determined as the source node in the data merge operation, which is not limited by the present disclosure.

Figure 11:
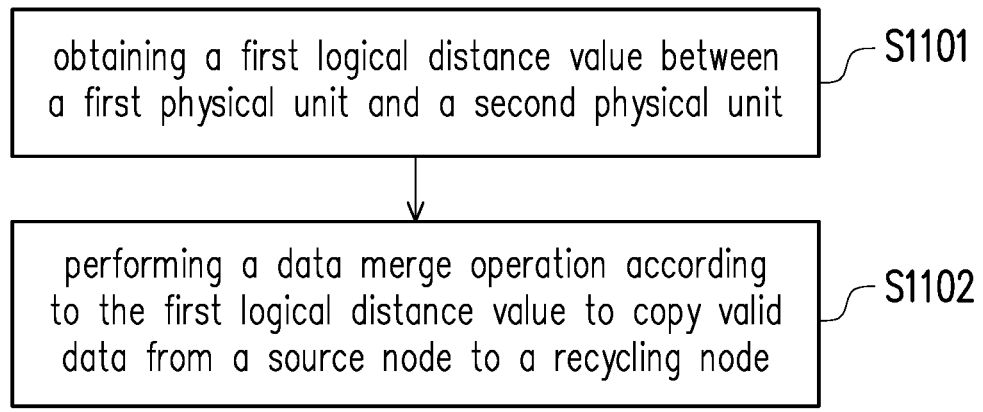
FIG. 11 is a flowchart of a data merge method according to an exemplary embodiment of the disclosure.

FIG. 11 is a flowchart of a data merge method according to an exemplary embodiment of the disclosure. Referring to FIG. 11, in step S1101, a first LDV between a first PU and a second PU is obtained. In step S1102, a data merge operation is performed according to the first LDV to copy the valid data from the source node to the recycling node.

Figure 12:
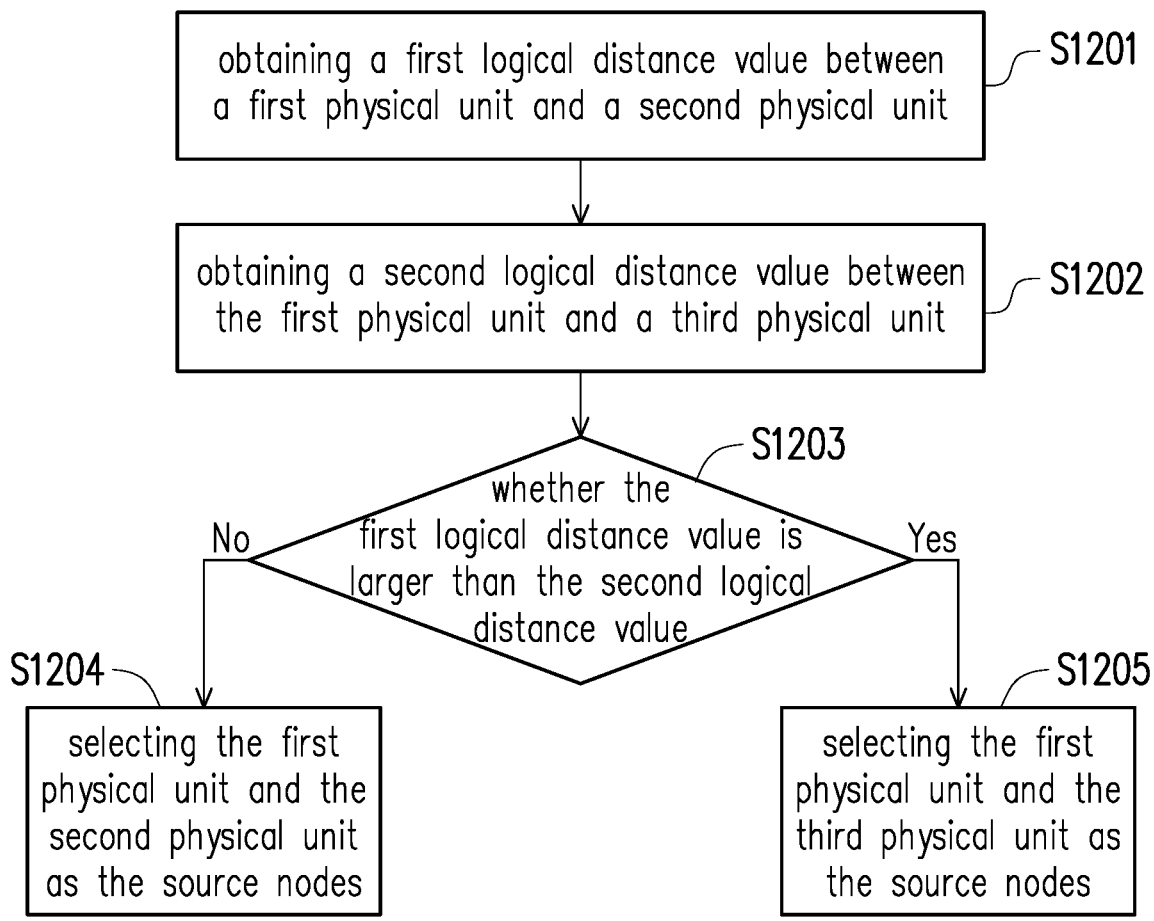
FIG. 12 is a flowchart of a data merge method according to an exemplary embodiment of the disclosure.

FIG. 12 is a flowchart of a data merge method according to an exemplary embodiment of the disclosure. Referring to FIG. 12, in step S1201, a first LDV between the first PU and the second PU is obtained. In step S1202, a second LDV between the first PU and a third PU is obtained. In step S1203, it is determined whether the first LDV is greater than the second LDV. If the first LDV is not greater than the second LDV, in step S1204, the first PU and the second PU are selected as the source nodes in the data merge operation. However, if the first LDV is greater than the second LDV, in step S1205, the first PU and the third PU are selected as the source nodes in the data merge operation. Then, the valid data may be copied from the source nodes to the recycle nodes in the data merge operation. It is noted that, in an exemplary embodiment, the step S1202 may be performed first and then the step S1201 may be performed or the steps S1201 and 1202 may be performed at the same time, which is not limited in the present disclosure.

Figure 13:
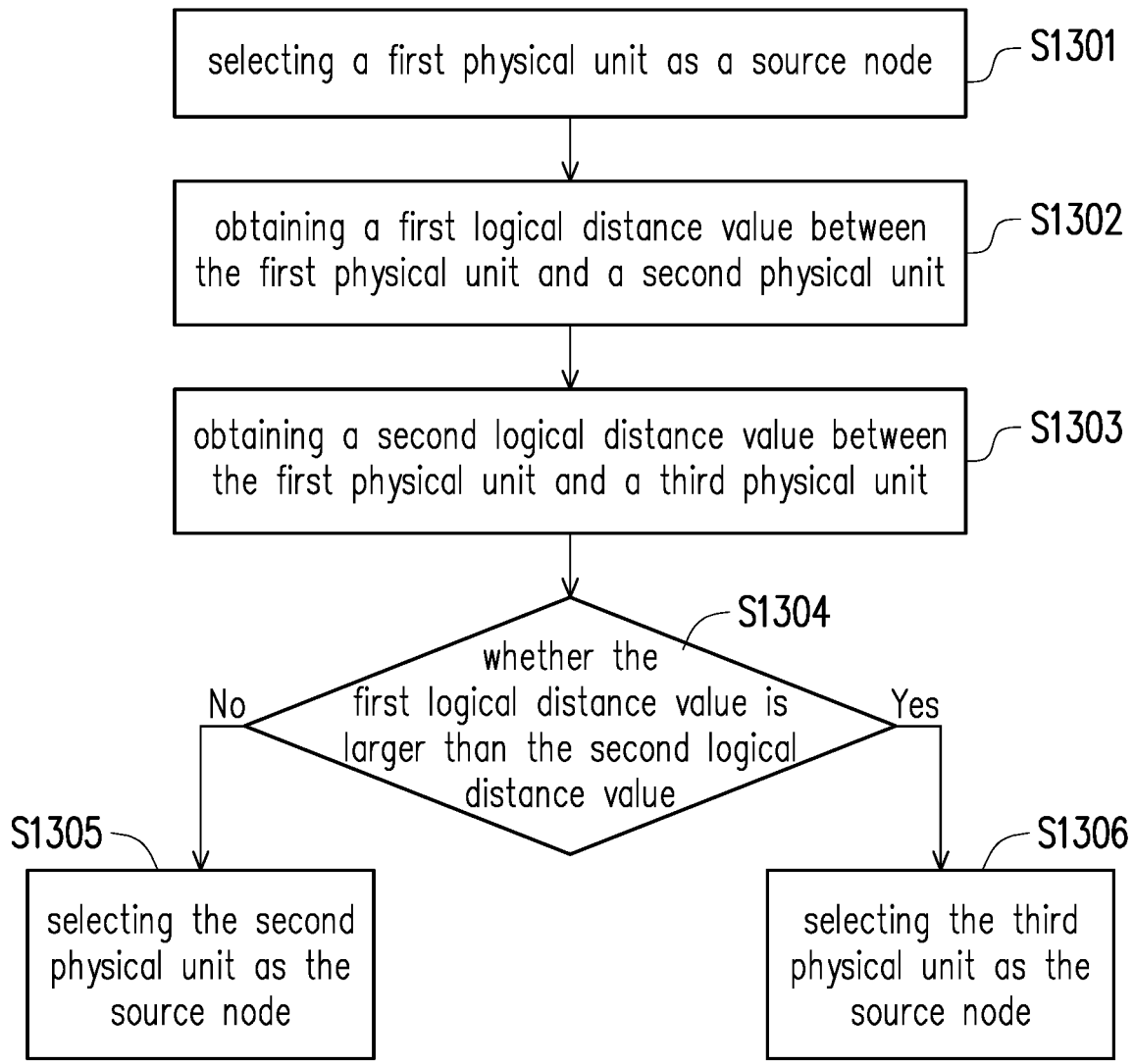
FIG. 13 is a flowchart of a data merge method according to an exemplary embodiment of the disclosure.

FIG. 13 is a flowchart of a data merge method according to an exemplary embodiment of the disclosure. Referring to FIG. 13, in step S1301, the first PU is selected as the source node in the data merge operation. After step S1301, valid data (also referred to as first data) may be copied from the first PU to the recycle node. In step S1302, a first LDV between the first PU and the second PU is obtained. In step S1303, a second LDV between the first PU and the third PU is obtained. In step S1304, it is determined whether the first LDV is greater than the second LDV. If the first LDV is not greater than the second LDV, in step S1305, the second PU is selected as the source node in the data merge operation. After the step S1305, valid data (also referred to as second data) may be copied from the second PU to the recycle node. However, if the first LDV is greater than the second LDV, in step S1306, the third PU is selected as the source node in the data merge operation. After the step S1306, valid data (also referred to as third data) may be copied from the third PU to the recycle node. It is noted that, in an exemplary embodiment, the step S1303 may be performed first and then the step S1302 may be performed or the steps S1302 and 1303 may be performed at the same time, which is not limited by the present disclosure.

However, the steps in FIG. 11 to FIG. 13 have been described in detail above and may not be reiterated here. It shall be noted that the steps in FIG. 11 to FIG. 13 may be implemented as multiple program codes or circuits, and the disclosure is not limited thereto. In addition, the methods of FIG. 11 to FIG. 13 may be used in combination with the embodiments above or may be used alone, and the disclosure is not limited thereto.

Based on the above, by considering the logical dispersion degree between the first LU mapped by the first PU and the second LU mapped by the second PU, the access count of the memory storage device during the data merge operation may be effectively reduced and the lifetime of the memory storage device may be extended.

The previously described exemplary embodiments of the present disclosure have the advantages aforementioned, wherein the advantages aforementioned not required in all versions of the disclosure.

It may be apparent to those skilled in the art that various modifications and variations may be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A data merge method, for a rewritable non-volatile memory module, wherein the rewritable non-volatile memory module comprises a plurality of physical units, the data merge method comprising:
   obtaining a first logical distance value between a first physical unit and a second physical unit among the physical units, wherein the first logical distance value reflects a logical dispersion degree between at least one first logical unit mapped by the first physical unit and at least one second logical unit mapped by the second physical unit; and
   performing a data merge operation according to the first logical distance value, so as to copy valid data from a source node among the physical units to a recycling node among the physical units,
   wherein the step of obtaining the first logical distance value between the first physical unit and the second physical unit among the physical units comprises:
   performing a first calculation on a plurality of first bits corresponding a first table mapping information of the first physical unit and a plurality of second bits corresponding a second table mapping information of the second physical unit to obtain at least one third bit; and
   obtaining the first logical distance value according to the at least one third bit.

2. The data merge method according to claim 1, wherein logical-to-physical mapping information of the at least one first logical unit is recorded in at least one first logical-to-physical mapping table, logical-to-physical mapping information of the at least one second logical unit is recorded in at least one second logical-to-physical mapping table, and the first logical distance value further reflects an overlapping degree between the at least one first logical-to-physical mapping table and the at least one second logical-to-physical mapping table.

3. The data merge method according to claim 1, wherein the step of performing the data merge operation according to the first logical distance value comprises:
   copying valid data in the first physical unit to the recycling node and copying valid data in the second physical unit to the recycling node if the first logical distance value is not larger than a target distance value; and
   copying valid data in the first physical unit to the recycling node and copying valid data in a third physical unit among the physical units to the recycling node if the first logical distance value is larger than the target distance value.

4. The data merge method according to claim 3, further comprising:
   obtaining a second logical distance value between the first physical unit and the third physical unit, wherein the target distance value comprises the second logical distance value.

5. The data merge method according to claim 1, wherein the first table mapping information reflects that logical-to-physical mapping information of the at least one first logical unit is recorded in at least one first logical-to-physical mapping table, and the second table mapping information reflects that logical-to-physical mapping information of the at least one second logical unit is recorded in at least one second logical-to-physical mapping table.

6. The data merge method according to claim 5, wherein the first table mapping information comprises a plurality of first values, the second table mapping information comprises a plurality of second values, and the step of obtaining the first logical distance value according to the first table mapping information and the second table mapping information comprises:
   obtaining a N-dimensional distance between the first values and the second values; and
   obtaining the first logical distance value according to the N-dimensional distance.

7. A memory storage device, comprising:
   a connection interface unit, configured to connect a host system;
   a rewritable non-volatile memory module which comprises a plurality of physical units; and
   a memory control circuit unit, coupled to the connection interface unit and the rewritable non-volatile memory module,
   wherein the memory control circuit unit is configured to obtain a first logical distance value between a first physical unit and a second physical unit among the physical units, wherein the first logical distance value reflects a logical dispersion degree between at least one first logical unit mapped by the first physical unit and at least one second logical unit mapped by the second physical unit, and
   the memory control circuit unit is further configured to perform a data merge operation according to the first logical distance value, so as to copy valid data from a source node among the physical units to a recycling node among the physical units,
   wherein the operation of obtaining the first logical distance value between the first physical unit and the second physical unit among the physical units by the memory control circuit unit comprises:
   performing a first calculation on a plurality of first bits corresponding a first table mapping information of the first physical unit and a plurality of second bits corresponding a second table mapping information of the second physical unit to obtain at least one third bit; and
   obtaining the first logical distance value according to the at least one third bit.

8. The memory storage device according to claim 7, wherein logical-to-physical mapping information of the at least one first logical unit is recorded in at least one first logical-to-physical mapping table, logical-to-physical mapping information of the at least one second logical unit is recorded in at least one second logical-to-physical mapping table, and the first logical distance value further reflects an overlapping degree between the at least one first logical-to-physical mapping table and the at least one second logical-to-physical mapping table.

9. The memory storage device according to claim 7, wherein the operation of performing the data merge operation according to the first logical distance value by the memory control circuit unit comprises:
instructing to copy valid data in the first physical unit to the recycling node and copy valid data in the second physical unit to the recycling node if the first logical distance value is not larger than a target distance value; and
instructing to copy valid data in the first physical unit to the recycling node and copy valid data in a third physical unit among the physical units to the recycling node if the first logical distance value is larger than the target distance value.

10. The memory storage device according to claim 9, wherein the memory control circuit unit is further configured to obtain a second logical distance value between the first physical unit and the third physical unit, and the target distance value comprises the second logical distance value.

11. The memory storage device according to claim 7, wherein the first table mapping information reflects that logical-to-physical mapping information of the at least one first logical unit is recorded in at least one first logical-to-physical mapping table, and the second table mapping information reflects that logical-to-physical mapping information of the at least one second logical unit is recorded in at least one second logical-to-physical mapping table.

12. The memory storage device according to claim 11, wherein the first table mapping information comprises a plurality of first values, the second table mapping information comprises a plurality of second values, and the operation of obtaining the first logical distance value according to the first table mapping information and the second table mapping information by the memory control circuit unit comprises:
obtaining a N-dimensional distance between the first values and the second values; and
obtaining the first logical distance value according to the N-dimensional distance.

13. A memory control circuit unit for controlling a rewritable non-volatile memory module comprising a plurality of physical units, and the memory control circuit unit comprising:
a host interface configured to couple to a host system;
a memory interface, configured to couple to the rewritable non-volatile memory module; and
a memory management circuit, coupled to the host interface and the memory interface,
wherein the memory management circuit is configured to obtain a first logical distance value between a first physical unit and a second physical unit among the physical units, wherein the first logical distance value reflects a logical dispersion degree between at least one first logical unit mapped by the first physical unit and at least one second logical unit mapped by the second physical unit, and
the memory management circuit is further configured to perform a data merge operation according to the first logical distance value, so as to copy valid data from a source node among the physical units to a recycling node among the physical units,
wherein the operation of obtaining the first logical distance value between the first physical unit and the second physical unit among the physical units by the memory management circuit comprises:
performing a first calculation on a plurality of first bits corresponding a first table mapping information of the first physical unit and a plurality of second bits corresponding a second table mapping information of the second physical unit to obtain at least one third bit; and
obtaining the first logical distance value according to the at least one third bit.

14. The memory control circuit unit according to claim 13, wherein logical-to-physical mapping information of the at least one first logical unit is recorded in at least one first logical-to-physical mapping table, logical-to-physical mapping information of the at least one second logical unit is recorded in at least one second logical-to-physical mapping table, and the first logical distance value further reflects an overlapping degree between the at least one first logical-to-physical mapping table and the at least one second logical-to-physical mapping table.

15. The memory control circuit unit according to claim 13, wherein the operation of performing the data merge operation according to the first logical distance value by the memory management circuit comprises:
instructing to copy valid data in the first physical unit to the recycling node and copy valid data in the second physical unit to the recycling node if the first logical distance value is not larger than a target distance value; and
instructing to copy valid data in the first physical unit to the recycling node and copy valid data in a third physical unit among the physical units to the recycling node if the first logical distance value is larger than the target distance value.

16. The memory control circuit unit according to claim 15, wherein the memory management circuit is further configured to obtain a second logical distance value between the first physical unit and the third physical unit, and the target distance value comprises the second logical distance value.

17. The memory control circuit unit according to claim 13,
wherein the first table mapping information reflects that logical-to-physical mapping information of the at least one first logical unit is recorded in at least one first logical-to-physical mapping table, and the second table mapping information reflects that logical-to-physical mapping information of the at least one second logical unit is recorded in at least one second logical-to-physical mapping table.

18. The memory control circuit unit according to claim 17, wherein the first table mapping information comprises a plurality of first values, the second table mapping information comprises a plurality of second values, and the operation of obtaining the first logical distance value according to the first table mapping information and the second table mapping information by the memory management circuit comprises:
obtaining a N-dimensional distance between the first values and the second values; and obtaining the first logical distance value according to the N-dimensional distance.

\* \* \* \* \*